United States Patent
Kim et al.

(10) Patent No.: US 7,501,800 B2
(45) Date of Patent: Mar. 10, 2009

(54) POWER FACTOR CORRECTION CIRCUIT AND OUTPUT VOLTAGE CONTROL METHOD THEREOF

(75) Inventors: Jung-Won Kim, Seoul (KR); Dae-Jung Kim, Incheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 0 days.

(21) Appl. No.: 11/232,737

(22) Filed: Sep. 21, 2005

(65) Prior Publication Data

US 2006/0062031 A1 Mar. 23, 2006

(30) Foreign Application Priority Data

Sep. 21, 2004 (KR) .................... 10-2004-0075537

(51) Int. Cl.
*G05F 1/40* (2006.01)
(52) U.S. Cl. .................. 323/207; 323/284; 363/89
(58) Field of Classification Search ......... 323/282–290, 323/222, 266, 224, 207, 298, 300; 363/80–82, 363/89, 79, 93, 97, 124
See application file for complete search history.

(56) References Cited

U.S. PATENT DOCUMENTS

| | | | | |
|---|---|---|---|---|
| 5,003,454 A | * | 3/1991 | Bruning | ........................ 363/81 |
| 5,289,361 A | | 2/1994 | Vinciarelli | |
| 5,349,284 A | * | 9/1994 | Whittle | ........................ 323/207 |
| 5,359,276 A | | 10/1994 | Mammano | |
| 5,594,323 A | * | 1/1997 | Herfurth et al. | ............. 323/222 |
| 6,686,725 B1 | | 2/2004 | Choi et al. | |
| 6,980,445 B2 | * | 12/2005 | Fukumoto et al. | ............. 363/45 |

FOREIGN PATENT DOCUMENTS

| | | |
|---|---|---|
| JP | 2001-268897 | 9/2001 |
| JP | 2002-374668 | 12/2002 |

* cited by examiner

*Primary Examiner*—Rajnikant B Patel
(74) *Attorney, Agent, or Firm*—Sidley Austin LLP

(57) ABSTRACT

Disclosed is a power factor correction circuit for varying an output voltage according to an input voltage, and an output voltage control method thereof. A reference voltage is generated corresponding to a voltage at an output terminal of a boost circuit at a predetermined time by using the status in which the voltage at the output terminal thereof has information on an input AC voltage until the predetermined time after the input AC voltage is applied in the boost circuit. The output voltage is controlled to be generated according to the reference voltage. Therefore, the output voltage is generated corresponding to the input AC voltage without any additional devices, and reduces power loss.

13 Claims, 3 Drawing Sheets

POWER FACTOR CORRECTION CIRCUIT AND OUTPUT VOLTAGE CONTROL METHOD THEREOF

CROSS REFERENCE TO RELATED APPLICATION

This application claims priority to and the benefit of Korea Patent Application No. 10-2004-0075537 filed on Sep. 21, 2004 in the Korean Intellectual Property Office, the entire content of which is incorporated herein by reference.

BACKGROUND OF THE INVENTION (a) Field of the Invention

The present invention relates to a power control techniques, and in particular, to power factor correction circuit and an output voltage control method thereof.

(b) Description of the Related Art

Most switching mode power supplies (SMPSs), such as the EN61000-3-2, use a power factor correction circuit because of the current harmonic rule. An SMPS converts an input voltage into at least one DC output voltage and is typically used, for example, in a mobile telephones and laptop computers. A power factor correction circuit is used in the SMPS to correct the power factor by controlling an input current to follow an input voltage. That is, the power factor correction circuit controls the input current to follow the external input voltage, and concurrently converts an input AC voltage into a constant DC voltage.

Most power factor correction circuits use a boost circuit. In general, the power factor correction circuit is manufactured to cover a wide range of voltages between 85Vac and 265Vac since the AC voltage supplied to home appliances is normally between 110Vac and 220Vac. The boost circuit used for the power factor correction circuit is designed such that the output voltage may be greater than the input voltage, and hence the output voltage of the boost circuit is to be substantially close to 400Vdc such that the boost circuit may be operable when the input voltage ranges from 85Vac to 256Vac.

However, an undesired switching loss occurs when the output voltage is designed to be 400V while the input voltage is low. The voltage at a switch when the switch is turned off in the power factor correction circuit is defined to be the output voltage, and an undesirable switching loss by the switch occurs when the output voltage is high (i.e., 400Vdc), even though a low input voltage is given. To solve this problem, the power factor correction circuit adopts the method for varying the output voltage according to the input voltage.

U.S. Pat. Nos. 5,349,284 and 6,686,725 disclose methods for varying the output voltage according to the input voltage. U.S. Pat. No. 5,349,284 discloses a method for detecting the peak value of an input voltage, varying a reference voltage compared to a corresponding output voltage, and thus varies the output voltage according to the input voltage. U.S. Pat. No. 6,686,725 discloses a method for using two output voltages according to the range of an input voltage. That is, the output voltage is set to be 220Vdc when the input voltage varies from 85Vac to 150Vac, and the output voltage is set to be 400Vdc when the input voltage varies from 150Vac to 265Vac.

FIG. 1 is a schematic diagram of a conventional power factor correction circuit disclosed in U.S. Pat. No. 6,686,725. In this circuit, when the input voltage ranges between 85Vac and 150Vac, the Zener diode ZD does not exceed the breakdown voltage and is turned off. The transistor Q1 is turned off as well. Therefore, the voltage input to an inverting terminal of (−) of a comparator 5A is generated by dividing the voltage of Vout by resistors 6 and 7, and the output voltage is established to be 220Vdc. However, when the input voltage ranges between 150Vac and 265Vac, the Zener diode ZD exceeds the breakdown voltage and is turned on, and the transistor Q1 is accordingly turned on. Therefore, the voltage input to the inverting terminal of (−) of the comparator 5A is decreased by dividing the voltage of Vout by the resistors 6 and 7 and a resistor R7, and the output voltage is established to be 400Vdc.

However, as shown in FIG. 1, the power factor correction circuit of U.S. Pat. No. 6,686,725 requires a plurality of external elements—e.g. diodes D1, D3, capacitors C1, C2, ZD, resistors R6, R7, switch for sensing the input voltage such that the output voltage can be varied according to the input voltage. These additional elements increase the overall costs. Similarly, a circuit disclosed in U.S. Pat. No. 5,349,284 also requires many external elements for sensing the input voltage, which also increases overall costs.

SUMMARY OF THE INVENTION

According to embodiments of the present invention, a power factor correction circuit and an output voltage control method thereof varies the output voltage by sensing an input voltage. The power factor correction circuit may comprise a boost circuit having a switch coupled to an input terminal and providing an output voltage to an output terminal according to an operation of the switch. The power factor correction circuit may further comprise a switching controller for generating a reference voltage according to the output voltage provided to the output terminal of the boost circuit until a predetermined time after an input AC voltage is applied to the input terminal of the boost circuit. The switching controller also controls the switch according to the generated reference voltage and the input AC voltage applied to the input terminal of the boost circuit.

The predetermined time is sufficient for indicating that the output voltage provided at the output terminal of the boost circuit corresponds to a predetermined range of the input AC voltage when the input AC voltage is initially applied to the input terminal of the boost circuit. The switching controller generates a first reference voltage when the output voltage provided to the output terminal of the boost circuit falls within a first voltage range. The switching controller generates a second reference voltage greater than the first reference voltage when the output voltage provided to the output terminal of the boost circuit falls within a second voltage range greater than the first voltage range.

According to another embodiment of the present invention, a method is provided for controlling an output voltage in a power factor correction circuit. The power factor correction circuit may include a switch coupled to an output terminal and a switching controller for controlling the switch. The power factor correction circuit supplies an output voltage to the output terminal according to the switching controller. The method comprises: sensing the output voltage at the output terminal of the boost circuit until a predetermined time after an input AC voltage is initially applied to the input terminal; generating a reference voltage corresponding to the sensed output voltage; and controlling the output voltage at the output terminal corresponding to the generated reference voltage.

The predetermined time is sufficient for determining that the output voltage provided to the terminal of the boost circuit corresponds to a predetermined range of the input AC voltage when the input AC voltage is initially applied to the input terminal of the boost circuit. Furthermore, the step of generating a reference voltage may comprise generating a first reference voltage when the sensed output voltage falls within a first voltage range, and generating a second reference voltage greater than the first reference voltage when the sensed output voltage falls within a second voltage range greater than the first voltage range.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

Figure 1:
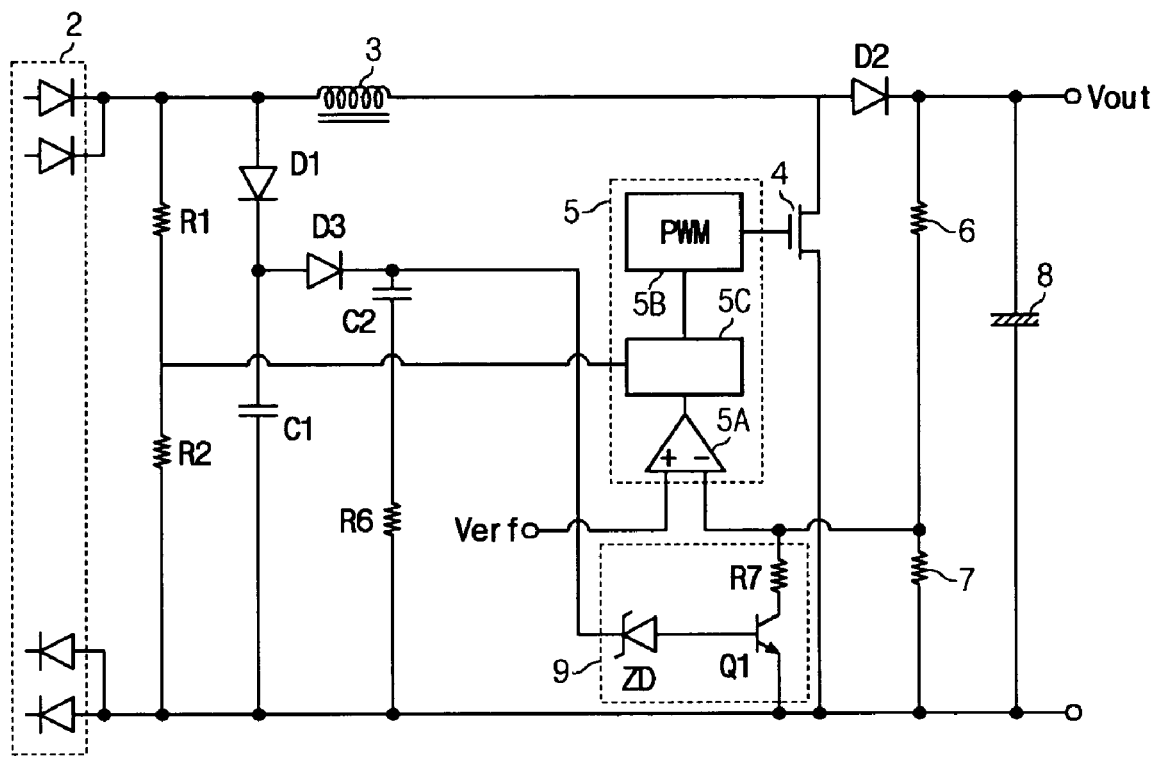
FIG. 1 is a schematic diagram of a conventional power factor correction circuit.
Figure 2:
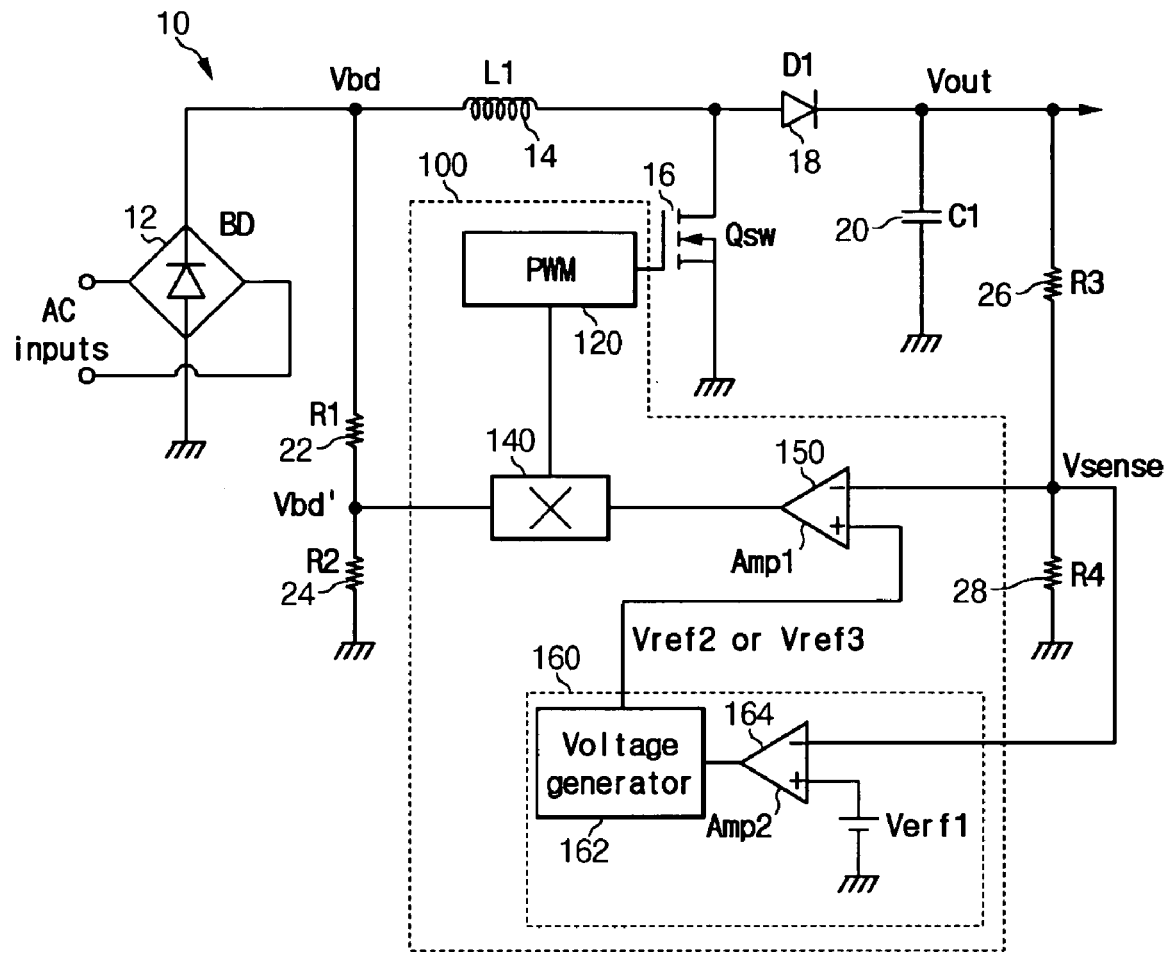
FIG. 2 is a schematic diagram of an exemplary power factor correction circuit, according to an embodiment of the present invention.
Figure 3:
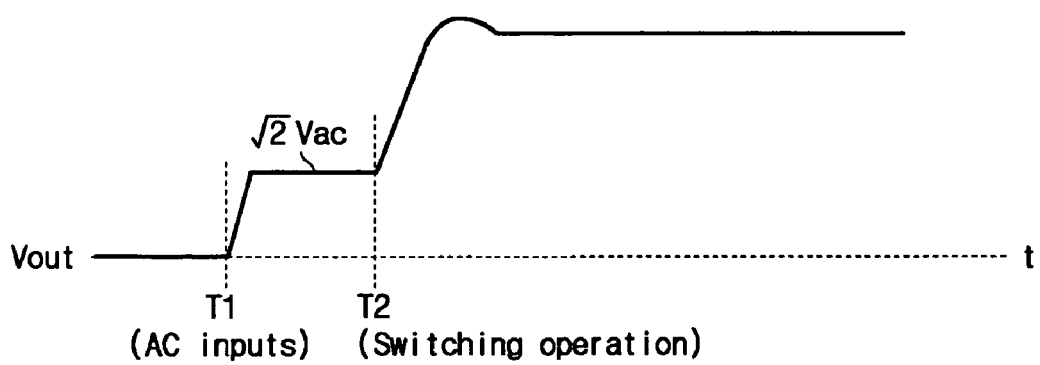
FIG. 3 is a graph of an exemplary variation of the output voltage when the power factor correction circuit initially starts up.
Figure 4:
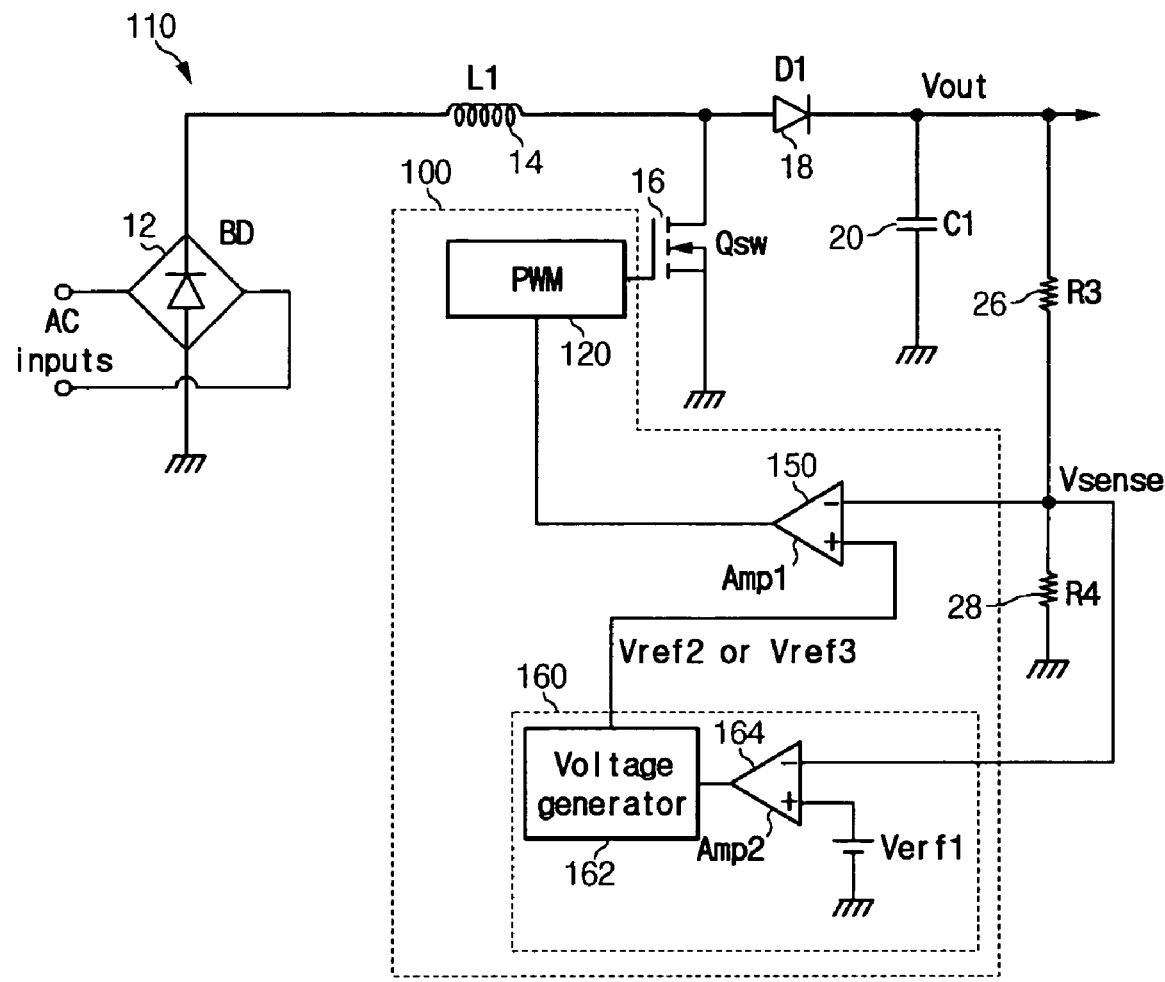
FIG. 4 is a schematic diagram of an exemplary power factor correction circuit, according to an embodiment of the present invention.

The embodiments of the present invention and their advantages are best understood by referring to FIGS. 2 through 4 of the drawings. Like numerals are used for like and corresponding parts of the various drawings.

FIG. 2 is a schematic diagram of an exemplary power factor correction circuit 10, according to an embodiment of the present invention. As shown, the power factor correction circuit 10 may include a boost circuit including a bridge diode BD 12, an inductor L1 14, a switch Qsw 16, a diode D1 18, a capacitor C1 20, and a switching controller 100.

The bridge diode BD 12 rectifies an external AC voltage and outputs a full-wave rectified voltage Vbd. The switching controller 100 receives a sensed rectified input voltage Vbd' and a sensed output voltage Vsense to generate a control signal for turning on/off the switch Qsw 16. The switch Qsw 16 is turned on/off by the control signal of the switching controller 100 in order to output a constant DC voltage Vout to the capacitor C1 20 of the boost circuit.

In this instance, reference voltages generated by the switching controller 100 of the power factor correction circuit 10 are established differently depending on the input voltage. Different output voltages Vout are accordingly generated and the input voltage is sensed, not by an additional circuit, but through the sensed output voltage Vsense, which will now be described in detail. The voltage Vbd is an output voltage of the bridge diode BD 12 which rectifies the input AC voltage.

The power factor correction circuit 10 may further include resistors R1 22 and R2 24 for sensing the rectified input voltage Vbd, and resistors R3 26 and R4 28 for sensing the output voltage Vout. The resistors R1 22 and R2 24 are coupled in series between an output terminal of the bridge diode BD 12 and the ground. Resistors R1 22 and R2 24 divide the voltage Vbd which produces a divided voltage Vbd'. The divided voltage Vbd' is input to the switching controller 100. The resistors R3 26 and R4 28 are coupled in series between the output voltage Vout and the ground, which produces a sensed output voltage Vsense. The sensed output voltage Vsense is input to the switching controller 100. In this instance, the input voltage Vbd rectified by the bridge diode BD 12 is not used for generating the reference voltage by the switching controller 100, but instead is used for generating a current reference used for the input current to follow the input voltage.

The inductor L1 14 in the boost circuit is coupled on one side to an output terminal of the bridge diode BD 12 and on the other side is coupled to an anode of the diode D1 18. A cathode of the diode D1 18 is coupled to the terminal of the capacitor C1 20, and another terminal of the capacitor C1 20 is grounded. A drain of the switch Qsw 16 is coupled to a node between the inductor L1 14 and the diode D1 18, a source thereof is grounded. The gate of switch Qsw 16 is coupled to an output terminal of the switching controller 100. In one embodiment, a sense resistor (not illustrated in FIG. 2) for sensing the current flowing through the switch Qsw 16 is generally coupled between the source of the switch Qsw 16 and the ground so that the sensed current is input to the switching controller 100. The switch Qsw 16 can be a MOSFET (as shown), or any other type of suitable switch, such as a bipolar transistor.

The switching controller 100 may include a pulse width modulation (PWM) circuit 120, a multiplier 140, a amplifier Amp1 150, and a reference voltage generator 160.

The reference voltage generator 160 may include a comparator Amp2 164 having an inverting terminal (−) for receiving the sensed output voltage Vsense and a non-inverting terminal (+) for receiving a reference voltage Vref1. The comparator Amp2 164 compares the two input voltages. The reference voltage generator 160 may further include a voltage generator 162 for generating a reference voltage Vref2 or Vref3 according to the output of the comparator Amp2 164.

More particularly, the comparator Amp2 164 outputs a Low signal when the sensed output voltage Vsense is greater than the reference voltage Vref1, and the comparator Amp2 164 outputs a High signal when the output voltage Vsense is less than the reference voltage Vref1. The voltage generator 162 outputs the reference voltage Vref2 when the comparator Amp2 164 outputs a High signal, and the voltage generator 162 outputs the reference voltage Vref3 when the comparator Amp2 164 outputs a Low signal. The implementation and operation of the voltage generator 162 is well known to a person skilled in the art.

FIG. 3 is a graph of an exemplary waveform which shows the variation of the output voltage when the power factor correction circuit 10 initially starts up. In this instance, the reference voltage Vref2 is set to be less than the reference voltage Vref3. The reference voltage generator 160 outputs the reference voltage Vref2 or Vref3 in response to the sensed output voltage Vsense from time T1, when the AC input voltage is initially applied to the power factor correction circuit 10, to time T2, when the switch Qsw 16 is switched. The reference voltage generator 160 outputs the reference voltage Vref2 or Vref3, as it is after time T2 when the switch Qsw 16 is switched to output a DC voltage.

The amplifier Amp1 150 receives the sensed output voltage Vsense through an inverting terminal (−) and the reference voltage Vref2 or Vref3 through a non-inverting terminal (+), and compares both voltages to output a corresponding voltage. The multiplier 140 multiplies the output of the amplifier Amp1 150 by the sensed full-wave rectified voltage Vbd, (sensed by the resistors R1 and R2), and outputs an output to the PWM circuit 120. In this instance, the output of the multiplier 140 has the same format as that of the full-wave rectified voltage and is used as a current reference by the PWM circuit 120. The PWM circuit 120 compares the current reference output by the multiplier 140 with the current that flows through the switch Qsw 16 and generates a gate signal for turning on/off the switch Qsw 16. The PWM circuit 120 outputs the gate signal to the gate terminal of the switch Qsw 16.

Referring to FIG. 2 and FIG. 3, the operation of the power factor correction circuit will now be described. In FIG. 3, time T1 indicates a time when the input AC voltage of the power factor correction circuit 10 is initially applied, and time T2 represents a time when the switch Qsw 16 starts switching. The output voltage Vout between time T1 and time T2 has the peak voltage ($\sqrt{2}$*Vac) of the input AC voltage. That is, since switch Qsw 16 is not operated from time T to time T2, the rectified voltage Vbd charges the capacitor C1 20 through the inductor L1 14 and the diode D1 18. The capacitor C1 20 is charged to the peak voltage ($\sqrt{2}$*Vac).

Further, the output voltage Vout reaches the desired DC output voltage after the switch Qsw 16 starts switching. Therefore, the output voltage Vout from time T1 to T2 is information for determining to which range of voltage the input AC voltage belongs. The power factor correction circuit 10 uses this information without additional external circuits to determine the range of input voltage. In addition, a voltage that is measured at a predetermined time after time T2 may be used as the output voltage Vout for indicating information on the input AC voltage since the output voltage is gently varied after the switch Qsw 16 is switched.

In particular, it is determined by the output voltage Vout from T1 to T2 whether the input AC voltage is in a range from 80Vac to 150Vac or from 150Vac to 256Vac. The output voltage Vout is then set according to this determination. In this instance, Vac represents the root mean square value of the input AC voltage, and the peak voltage of the full-wave rectified voltage Vbd corresponds to the peak voltage ($\sqrt{2}$*Vac) since the full-wave rectified voltage Vbd is generated by full-wave rectifying the input AC voltage.

The peak voltage ($\sqrt{2}$*Vac) from T1 to T2 is sensed by the resistors R3 26 and R4 28, and the sensed voltage Vsense is input to the inverting terminal of the comparator Amp2 164. When the input AC voltage ranges from 80Vac to 150Vac, the sensed voltage Vsense will have a value of Vsense1. When the input AC voltage ranges from 150 Vac to 250 Vac, the sensed voltage Vsense will have a value of Vsense2. Methods are provided for varying the output voltage Vout in the case of a voltage Vsense1, and in the case of a voltage Vsense having a value Vsense2. These methods will now be respectively described.

When the sensed voltage Vsense is Vsense1, the comparator Amp2 164 compares the reference voltage Vref1 and the sensed voltage Vsense1 and outputs a High signal. In this instance, the reference voltage Vref1 is used as a predetermined reference for determining whether the input AC voltage ranges from 80Vac to 150Vac or from 150Vac to 250Vac. The reference voltage generator 162 generates a low voltage Vref2 and outputs the same to the amplifier Amp1 150 when the comparator Amp2 164 outputs the High signal.

In this instance, the reference voltage Vref2 generated by the reference voltage generator 162 from time T1 to T2 is not varied after time T2. The reference voltage Vref2 is input to the non-inverting terminal (+) of the amplifier Amp1 150. The amplifier Amp1 150 compares the sensed voltage Vsense1 and the reference voltage Vref2 and outputs a corresponding value. The multiplier 140 multiplies the output of the amplifier Amp1 150 and the voltage Vbd' and provides a current reference to the PWM circuit 120, which uses the current reference to control whether to turn on or off the switch Qsw 16. The switch Qsw 16 is turned on or off according to the turn on/off control signal of the PWM circuit 120 such that the input current follows the input voltage, and the output voltage then becomes a DC voltage Vout1 corresponding to the reference voltage Vref2. Therefore, the corresponding voltage Vout1 is output when the input AC voltage ranges from 80Vac to 150Vac.

When the sensed voltage Vsense is Vsense2, the comparator Amp2 164 compares the reference voltage Vref1 and the sensed voltage Vsense2 and outputs a Low signal. In this instance, the voltage generator 162 generates a voltage Vref3 (which is greater than the voltage Vref1) and outputs the voltage Vref3 to the non-inverting terminal (+) of the amplifier Amp1 150 when the Low signal is output from the comparator Amp2 162. In this instance, as shown in FIG. 3, the reference voltage Vref3 generated by the reference voltage generator 160 from time T1 to T2 is not varied after time T2 since the sensed voltage Vsense provides no information on the range of the input AC voltage after time T2 or after a predetermined time subsequent to T2.

The reference voltage Vref3 is input to the non-inverting terminal (+) of the amplifier Amp1 150. The amplifier Amp1 150 compares the sensed voltage Vsense2 with the reference voltage Vref3 and outputs a corresponding value. In this instance, the multiplier 140 multiplies the output of the amplifier Amp1 150 and the voltage Vbd' to apply a current reference to the PWM circuit 120. The PWM circuit 120 uses the current reference to determine whether to turn on or off the switch Qsw 16. The switch Qsw 16 is turned on or off according to the turn on/off control signal of the PWM circuit 120 such that the input current follows the input voltage and the output voltage Vout then outputs a DC voltage Vout2 greater than Vout1 in correspondence to the reference voltage Vref3. Therefore, the corresponding voltage Vout2 is output when the input AC voltage is in a range from 150Vac to 250Vac.

When the external input AC voltage is applied, the output voltage Vsense is sensed until a predetermined time (e.g., time T2). This causes the voltage generator 162 to generate the reference voltage (Vref2 or Vref3) by using information on the input AC voltage to generate the output voltage Vout corresponding to the input AC voltage. This does not require any additional devices, and reduces power loss by generating the output voltage Vout corresponding to the input AC voltage.

Although the power factor correction circuit has been described above in the context of sensing the rectified AC voltage Vbd, the present invention may also be applied to a power factor correction circuit for sensing no rectified AC voltage Vbd. That is, the present invention may also be applied to power factor correction circuits for controlling the input current such that it follows the format of input voltage.

FIG. 4 is a schematic diagram of an exemplary power factor correction circuit 110, according to an embodiment of the present invention. In other words, FIG. 4 is a schematic diagram of an exemplary a power factor correction circuit for sensing no rectified AC voltage.

Although the configuration and operation of the power factor correction circuit shown in FIG. 4 is similar to that of FIG. 2, the exemplary power factor correction circuit 110 shown in FIG. 4 does not sense the full-wave rectified AC voltage, and accordingly has no multiplier 140. That is, whether the input AC voltage is in a range between 80Vac and 150Vac or between 150Vac and 256Vac is determined by using the output voltage Vout given from time T1 to T2, and the reference voltage generator 160 outputs one of the reference voltages Vref2 or Vref3 according to the determined input AC voltage. Also, the PWM circuit 120 controls switching the switch Qsw 16 by using the output of the amplifier Amp1 150 without receiving the rectified AC voltage.

As described, when an external input AC voltage is applied, the output voltage up to a predetermined time generates the reference voltage by using information on the input AC voltage to thereby generate an output voltage corresponding to the input AC voltage. This does not require additional devices and reduces power loss by generating the output voltage Vout in correspondence with the input AC voltage.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power factor correction circuit comprising:
   a boost circuit having a switch coupled to an input terminal and supplying an output voltage to an output terminal according to an operation of the switch; and
   a switching controller for generating a reference voltage according to the output voltage provided to the output terminal of the boost circuit for a predetermined delay time after an input AC voltage is applied to the input terminal of the boost circuit, and for controlling the switch according to the generated reference voltage and the input AC voltage,
   wherein the switching controller comprises:
   a first comparator for comparing a voltage that corresponds to the output voltage during the delay time with a first comparator reference voltage and for outputting a corresponding first comparator voltage;
   a voltage generator for generating the reference voltage with a first level or a second level depending on a level of the first comparator voltage;
   a second comparator for comparing the reference voltage and a voltage that corresponds to the output voltage and for outputting a second comparator voltage;
   a multiplier for multiplying the second comparator voltage and a voltage that corresponds to the input AC voltage applied to the input terminal of the boost circuit; and
   a pulse width modulation circuit for controlling the switch according to an output of the multiplier.

2. The power factor correction circuit of claim 1, wherein the predetermined time is sufficient for determining that the output voltage provided at the output terminal of the boost circuit corresponds to a predetermined range of the input AC voltage when the input AC voltage is applied to the input terminal of the boost circuit.

3. The power factor correction circuit of claim 1, wherein the switching controller generates a first level reference voltage when the output voltage falls within a first voltage range, and the switching controller generates a second level reference voltage greater than the first reference voltage when the output voltage falls within a second voltage range at least partially higher than the first voltage range.

4. The power factor correction circuit of claim 1, further comprising:
   a first resistor and a second resistor coupled in series between the input terminal of the boost circuit and the ground; and
   a third resistor and a fourth resistor coupled in series between the output terminal of the boost circuit and the ground,
   wherein a voltage at a node of the first and second resistors is applied to the multiplier and a voltage at a node of the third and fourth resistors is applied to the first amplifier and the first comparators.

5. A method for controlling an output voltage in a power factor correction circuit including a switch coupled to an output terminal and a switching controller for controlling the switch, wherein the switching controller comprises a first comparator for comparing a voltage that corresponds to the output voltage during the delay time with a first comparator reference voltage and for outputting a corresponding first comparator voltage; a voltage generator for generating a reference voltage with a first level or a second level according to the first comparator voltage; a second comparator for comparing the reference voltage and a voltage that corresponds to the output voltage and for outputting a second comparator voltage; and a multiplier, the power factor correction circuit providing an output voltage to the output terminal according to control by the switching controller, the method comprising:
   sensing the output voltage at the output terminal of the boost circuit for a predetermined time after an input AC voltage is initially applied to the input terminal;
   comparing the sensed output voltage to a first comparator reference voltage during the delay time and outputting a first comparator voltage;
   generating a reference voltage with a first or second level depending on a level of the first comparator voltage;
   comparing the reference voltage to the sensed output voltage and generating a second comparator voltage; and
   controlling the output voltage at the output terminal according to the generated second comparator voltage.

6. The method of claim 5, wherein the predetermined time is sufficient for determining that the output voltage provided to the output terminal of the boost circuit corresponds to a predetermined range of the input AC voltage when the input AC voltage is initially applied to the input terminal of the boost circuit.

7. The method of claim 5, wherein generating a reference voltage comprises:
   generating a first level reference voltage when the sensed output voltage falls within a first voltage range; and
   generating a second level reference voltage greater than the first reference voltage when the sensed output voltage falls within a second voltage range at least partially higher than the first voltage range.

8. The method of claim 7, wherein a first output voltage is provided as the output voltage when the first level reference voltage is generated, and a second output voltage greater than the first output voltage is provided as the output voltage when the second level reference voltage is generated.

9. A power factor correction circuit comprising:
   a boost circuit having a switch coupled to an input terminal and supplying an output voltage to an output terminal according to an operation of the switch; and
   a switching controller for generating a reference voltage according to the output voltage provided to the output terminal of the boost circuit until a predetermined time after an input AC voltage is applied to the input terminal of the boost circuit, and controlling the switch according to the generated reference voltage only, without having a direct electrical connection to the input terminal;

wherein the switching controller comprises:

a first comparator for comparing a voltage that corresponds to the output voltage during delay time with a first comparator reference voltage and for outputting a corresponding first comparator voltage; and a voltage generator for generating the reference voltage with a first level or a second level according to the first comparator voltage.

10. The power factor correction circuit of claim 9, wherein the predetermined time is sufficient for determining that the output voltage provided at the output terminal of the boost circuit corresponds to a predetermined range of the input AC voltage when the input AC voltage is applied to the input terminal of the boost circuit.

11. The power factor correction circuit of claim 9, wherein the switching controller generates a first reference voltage when the output voltage provided to the output terminal of the boost circuit falls within a first voltage range, and the switching controller generates a second reference voltage greater than the first reference voltage when the output voltage provided to the output terminal of the boost circuit falls within a second voltage range at least partially higher than the first voltage range.

12. The power factor correction circuit of claim 11, wherein the reference voltage generator comprises:

a first comparator for comparing a voltage that corresponds to the output voltage provided to the output terminal of the boost circuit with a predetermined reference voltage at the predetermined time; and a voltage generator for generating one of the first reference voltage and the second reference voltage according to an output of the first comparator.

13. A power factor correction circuit comprising:

a boost circuit having a switch coupled to an input terminal and supplying an output voltage to an output terminal according to an operation of the switch; and a switching controller for generating a reference voltage according to the output voltage for a predetermined delay time after an input AC voltage is applied to the input terminal of the boost circuit, and for controlling the switch according to the generated reference voltage only, without directly using information about the input voltage, wherein the switching controller comprises:

a first comparator for comparing a voltage that corresponds to the output voltage during the delay time with a first comparator reference voltage and for outputting a corresponding first comparator voltage;

a voltage generator for generating the reference voltage with a first level or a second level according to the first comparator voltage;

a second comparator for comparing the reference voltage and a voltage that corresponds to the output voltage and for outputting a second comparator voltage; and a pulse width modulation circuit for controlling the switch according to the second comparator voltage.

* * * * *